United States Patent [19]
Wheat et al.

[11] Patent Number: 5,076,516
[45] Date of Patent: Dec. 31, 1991

[54] HIGH DRAG AIRFOIL APPARATUS

[76] Inventors: Robert B. Wheat, 905 Kings Bridge Dr., Garland, Tex. 75040; Roy D. Wheat, 1202 Oriole La., Garland, Tex. 75042

[21] Appl. No.: 9,370

[22] Filed: Jan. 30, 1987

Related U.S. Application Data

[63] Continuation of Ser. No. 665,632, Oct. 29, 1984, abandoned, which is a continuation-in-part of Ser. No. 465,543, Feb. 10, 1983, abandoned.

[51] Int. Cl.$^5$ .............................................. B64D 27/00
[52] U.S. Cl. .................................... 244/154; 244/213; 244/198
[58] Field of Search ........... 244/154, 198, 213, 155 A, 244/35 R

[56] References Cited

U.S. PATENT DOCUMENTS

| 1,400,735 | 12/1921 | Eddy | 244/154 |
| 1,839,194 | 1/1932 | Blondin | 244/45 A |
| 1,893,064 | 1/1933 | Zaparka | 244/198 |
| 3,194,521 | 7/1965 | Rider et al. | 244/154 |

Primary Examiner—Joseph F. Peters, Jr.
Assistant Examiner—Christopher P. Ellis
Attorney, Agent, or Firm—Richards, Medlock & Andrews

[57] ABSTRACT

Disclosed are airfoil structures which provide two distinct mean centers of lift and high induced drag. Also disclosed are aircraft structures employing such high-lift high-drag airfoils for both the lifting wing and the horizontal stabilizer with the center of gravity disposed between the mean centers of lift of the fore and aft airfoils.

36 Claims, 3 Drawing Sheets

HIGH DRAG AIRFOIL APPARATUS

This application is a continuation of application Ser. No. 06/665,632 filed Oct. 29, 1984, entitled "High Drag Airfoil Apparatus" (now abandoned) which is a continuation-in-part of application Ser. No. 465,543 filed Feb. 10, 1983, entitled "High Drag Airfoil Apparatus" (now abandoned).

This invention relates to aircraft structures and methods of maintaining aircraft stability in relatively low relative wind conditions. More particularly, it relates to aircraft employing at least two longitudinally displaced airfoil lifting surfaces, each incorporating structure to produce relatively high induced drag, with the mean center of lift of one lifting surface disposed forward of the center of gravity of the aircraft and the mean center of lift of another lifting surface disposed aft of the center of gravity.

Since ancient times kites of various design have been flown for amusement and other purposes. Kites generally comprise a relatively lightweight body presenting at least one relatively flat surface upwind at a relatively high angle of attack, an anchor harness such as string, and some drag-inducing dampening means such as a tail. Kites do not usually employ an airfoil in the conventional sense, but instead employ a relatively flat plate with a high angle of attack presented to relative wind to generate lift.

Since the invention of the glider and powered airplane using airfoil wings to generate lift, attempts have been made to fly unpowered airfoils in tethered arrangements such as conventionally used for kites. An unpowered craft using airfoils for lift which can be flown in a tethered arrangement has particular appeal as a novelty or toy if the unpowered craft can be made to simulate or duplicate the physical appearance of a conventional airplane in flight. However, because of the aerodynamically clean design of airplanes, a scale model airplane cannot readily be flown as a captive glider using merely a tether without artificial drag-inducing means such as a tail or the like or other means to provide lateral stability at the relatively low airspeed or relative wind conditions in which tethered unpowered craft must perform. Obviously, the attachment of a drag-inducing tail seriously detracts from the desired visual illusion. However, without artificial drag-inducing means or other stabilizing means scale models of airplanes suffer severe lateral instability and/or overfly the fixed remote end of the tether line to enter a steep uncontrolled dive, thus they cannot ordinarily be successfully flown in tethered arrangements.

In accordance with the present invention, apparatus is provided which in many respects resembles conventional airplane configuration but which deviates from conventional airplane design by incorporating an airfoil producing high lift and high induced drag in the horizontal stabilizer and also using high lift and high induced drag airfoils for the lifting wings. By locating the center of gravity of the craft between the center of lift of the wings and the center of lift of the airfoil horizontal stabilizer, unusual flight characteristics are obtained which cause the aircraft to be extremely stable in pitch and yaw at extremely low airspeeds. Because of the unique flight characteristics of aircraft employing the principles of the invention, simulated aircraft which have the general configuration and appearance of conventional aircraft may be flown in tethered arrangements on a single tether line in relatively low wind conditions. Furthermore, tethered aircraft employing the invention respond to changes in relative wind to automatically reduce angle of attack with increased airspeed. Therefore, the craft may be controlled by manipulation of the single tether line to climb, cruise in level flight, descend and even perform aerobatic maneuvers with such realism that the maneuvers emulate the same maneuvers performed by conventional aircraft. Additionally, by appropriate positioning of the thrust (tether) line, the aircraft may be readily rigged to maintain level flight almost directly overhead of the remote fixed end of its tether line and thus never overfly the operator. Other features and advantages of the invention will become more readily understood when taken in connection with the appended claims and attached drawing in which:

The principles of generating lift with an airfoil moving through a relative wind component (with either the aircraft or the wind component moving or fixed with respect to earth) are, of course, identical. Accordingly, the principles of flight for an aircraft wherein thrust is provided by an onboard motive force which moves the aircraft through the air and a tethered aircraft wherein the craft is tethered to a fixed point or another towing craft are generally equally applicable. Of course, in a tethered aircraft flight control surfaces may be much more simplified.

As the principles of flight become better understood, means for generating lift (generally referred to as airfoils) of various configurations have been designed and utilized to take advantage of various phenomena. In the most basic of aircraft designs, the aircraft comprises a longitudinally extending fuselage with substantially laterally extending wings to provide the necessary lift. Furthermore, in the most basic airfoil design, the linear distance measured along the top surface of the airfoil is substantially greater than the chord of the wing and the undersurface of the airfoil is approximately the same as the chord. Accordingly, air travelling over the wings travels faster over the upper surface than the lower surface, thus providing lift. The center of lift (the average or mean point of vertical lift forces across the top surface of the wing) will, of course, move fore and aft along the wing with changes in angle of attack but, in level flight, is substantially at the same point (fore to aft) as the center of gravity of the aircraft. The trailing edge of the airfoil is usually tapered to a point to reduce drag. Roll stability of the craft is provided by the dihedral of the wings and pitch control is provided by a horizontal stabilizer generally positioned aft of the wings. Yaw control is provided by a vertical stabilizer, usually also aft of the wing, and may incorporate a moveable rudder to variably control the direction of flight of the aircraft.

Figure 1:
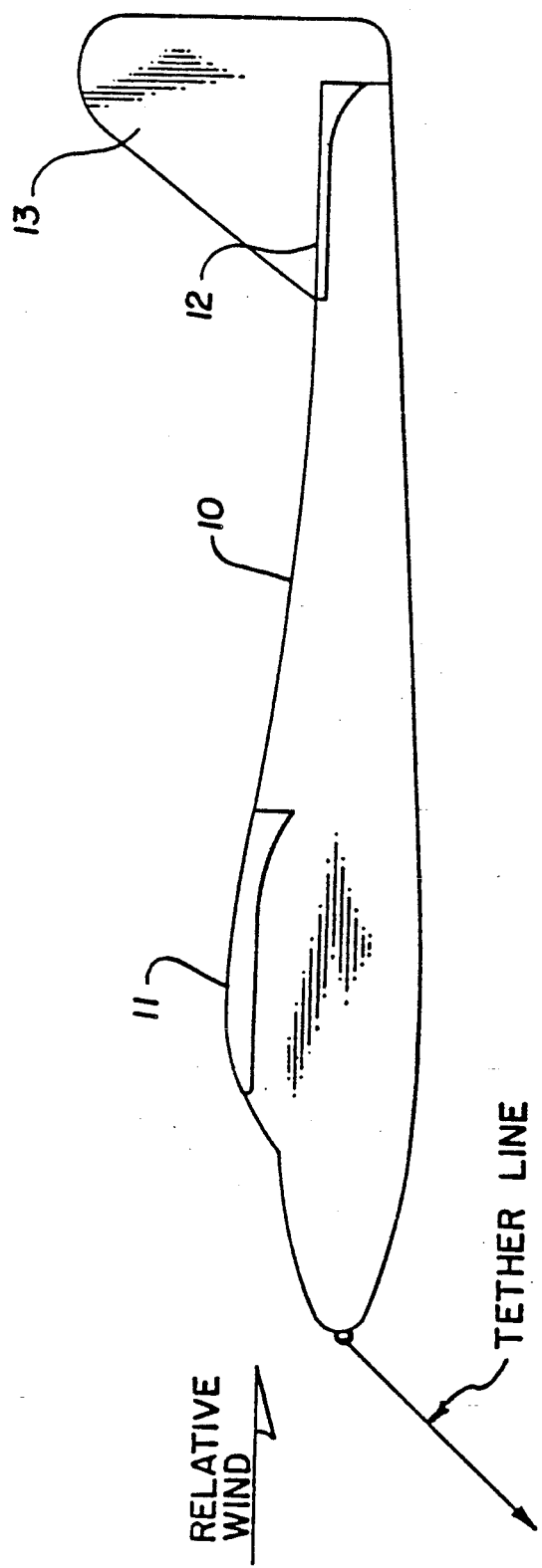
FIG. 1 is a side view of a craft of basically conventional aircraft configuration employing the principles of the invention.

In accordance with the invention, aircraft employing the same general components may be designed which, when modified in accordance with the principles of the invention, exhibit flight characteristics heretofore unattainable. For example, as illustrated in FIG. 1, a tethered aircraft employing the invention is shown having a fuselage 10 of conventional configuration. The craft employs an airfoil wing 11, a horizontal stabilizer 12 and a vertical stabilizer 13 with the vertical and horizontal stabilizers disposed well aft of the wings as in conventional aircraft configurations. The aircraft of FIG. 1, however, departs substantially from conventional design in the airfoil configuration of the wing 11, the configuration of horizontal stabilizer 12, and the placement of center of gravity. Since center of gravity can be controlled by appropriate distribution of mass, center of gravity does not affect outward appearance of the craft. Therefore, the only visible deviations from conventional craft exhibited by craft employing the principles of the invention are the configurations of the airfoils used for the wings and the horizontal stabilizer. These deviations, as will be explained in detail hereinafter, are immediately apparent upon close inspection of the craft but are not readily visibly apparent to the naked eye when the aircraft is in flight.

Figure 2:
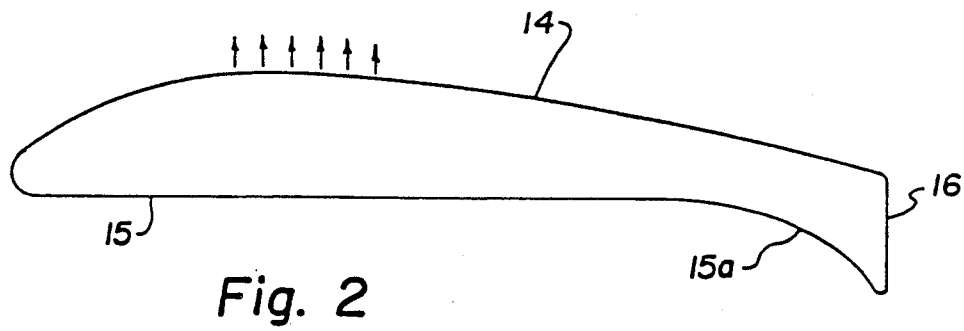
FIG. 2 is a sectional view of one preferred embodiment of the modified airfoil of the invention.

In order to produce an aircraft capable of flight in extremely low relative wind conditions, the airfoil used for the wing must be designed to produce relatively high lift. In accordance with the invention, the wing airfoil produces not only high lift, but produces a first lift component on the top surface and a second lift component resulting from the configuration of the lower surface and also produces a relatively high induced drag. One preferred embodiment of the airfoil design of the invention is illustrated in FIG. 2. It will be observed that in the airfoil design of FIG. 2, the upper surface 14 of the wing is convexly curved and thus longer than the chord of the wing. The lower surface 15 of the wing beginning at the leading edge and traversing a major portion thereof is substantially flat and parallel with the chord of the wing so that the upper surface 14, in cooperation with the lower surface 15 of the forward section of the wing, defines a substantially conventional airfoil for providing lift. For purposes of discussion, the lift generated by the airfoil of FIG. 2 as described hereinabove will be referred to as the first lift component. The first lift component is, of course, distributed over the curved surface and has a mean or average point which moves fore to aft with decrease in angle of attack.

The airfoil of FIG. 2 deviates from conventional airfoil configuration by the inclusion of a downwardly diverging section 15a on the lower surface 15 adjacent the trailing edge of the wing. The downwardly diverging section 15a radically departs from the line parallel with the chord and is not paralleled by the corresponding upper surface. Accordingly, as the lower surface defined by the downwardly diverging section 15a departs from the curvature of the upper surface 14, the trailing edge of the wing becomes relatively thick and terminates in a thick blunt trailing edge 16, the vertical surface of which is substantially normal to the chord line of the wing. The downwardly diverging section 15a near the trailing edge results in a thickened trailing edge for the airfoil and, since the curvature of the downwardly diverging section 15a also departs radically from the curvature of the upper surface 14, the thickened trailing edge of the wing defines an airfoil providing a lift component separate and distinct from that defined by the upper surface 14. Since the downwardly diverging section 15a departs radically from the chord line of the wing, the lift component provided thereby (hereinafter referred to as the second lift component) is distinct from the normal lift component provided by the upper surface 14. Furthermore, the fore to aft shift of the average or mean center of lift provided by the downwardly diverging section 15a with change in angle of attack moves only slightly with changing angle of attack. Thus as the angle of attack of the airfoil with respect to relative wind decreases, the mean center of lift provided by the first and second lifting components is displaced substantially aft of the mean center of lift of the first lift component. Furthermore, the relatively thick trailing edge of the wing having a blunt surface normal to the chord line of the wing provides a very high induced drag factor. Therefore, the airfoil as shown in FIG. 2 produces extremely high lift and also extremely high induced drag at relatively low airspeeds.

Figure 2A:
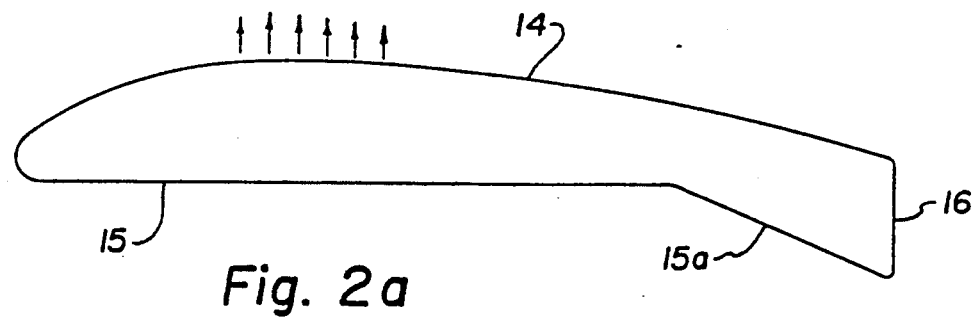
FIG. 2a is a sectional view of a modified embodiment of the airfoil of FIG. 2.

It will be readily appreciated that an airfoil designed to produce first and second major centers of lift and high induced drag as described hereinabove need not be configured precisely as illustrated in FIG. 2. For example, a modified version thereof is illustrated in FIG. 2a wherein the upper surface 14 is curved with respect to the chord as illustrated in FIG. 2 but wherein the downwardly diverging section 15a, instead of being a curved surface of constant or changing radius, is defined by a relatively straight line diverging from the plane of the forward portion of the lower surface 15.

Figure 3:
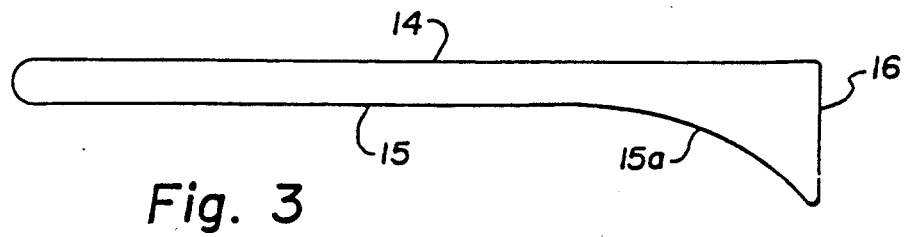
FIG. 3 is a sectional view of an alternative embodiment of the modified airfoil of the invention.
Figure 3A:
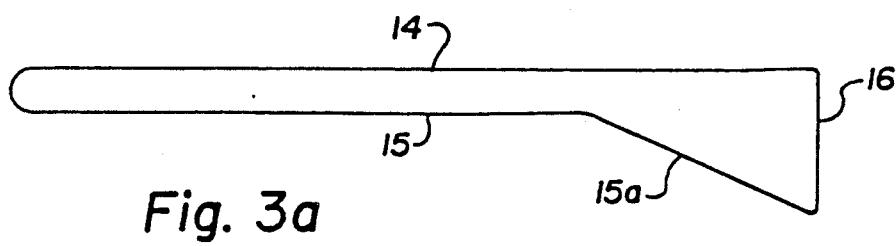
FIG. 3a is a sectional view of a modified embodiment of the airfoil of FIG. 3.

Similarly, in FIG. 3 a modified airfoil in accordance with the invention is illustrated wherein the upper surface 14 and the lower surface 15 are substantially parallel with each other and the chord line of the wing. The structure of the wing of FIG. 3 forward of downwardly diverging section 15a thus is essentially a flat plate and will produce high lift at high angles of attack. However, as the angle of attack approaches zero, the lift provided by the wing forward of the downwardly diverging section 15a also approaches zero. The downwardly diverging section 15a, however, still continues to provide lift and the thickened trailing edge still produces high induced drag. Accordingly, the airfoil of FIG. 3 still produces a high lift high drag airfoil at high angles of attack with a rearwardly shifted center of lift and high drag in level flight. Similarly, as illustrated in the lifting surface of FIG. 3a the downwardly diverging section 15a need not be a curved surface but may be a relative flat surface which deviates from the plane of lower surface 15. Nevertheless, the structure performs aerodynamically in much the same manner as the structure shown in FIG. 3. It will thus be observed that by employing any of the airfoil designs illustrated in FIGS. 2, 2a, 3 or 3a in the aircraft of FIG. 1, a wing having first and second distinct centers of lift and high induced drag is realized. Use of curved upper surfaces as illustrated in FIGS. 2 and 2a contributes somewhat to the realism of visual effect of the aircraft since conventional airfoils include curved upper surfaces. The curved upper surface of the airfoil also obviously contributes to the lift component. Use of a curved upper surface as illustrated in FIGS. 2 and 2a also provides an airfoil wing of thicker cross-section, thus simplifying structural stressing of the wing by permitting use of a thicker wing.

In order to produce an aircraft which automatically responds to variations in relative wind by varying the angle of attack of the airfoil wing, the aircraft of the invention also employs a lifting airfoil for the horizontal stabilizer. In order to produce an unpowered aircraft for tethered flight in extremely low relative wind conditions, an airfoil employing a similar configuration as described above is used for the horizontal stabilizer 12.

As illustrated in FIG. 1, the horizontal stabilizer 12 employs the airfoil of FIG. 3. It would be readily recognized that since the center of gravity of the craft is aft of the main center of lift of the wings as described hereinafter, the airfoil used for the horizontal stabilizer must provide a certain amount of lift in level flight (zero angle of attack) and also produce high induced drag.

In order to produce a tethered craft in which the angle of attack of the aircraft is automatically reduced with increasing relative wind (as would be required to prevent the aircraft from overflying a fixed tether point), the center of gravity of the aircraft in level flight must be aft of the mean center of lift of the wing and forward of the mean center of lift of the horizontal stabilizer. This configuration radically departs from conventional aircraft design wherein the center of gravity is ordinarily directly below the average center of lift of the wing in level flight.

As noted above, the center of gravity can be determined by appropriate distribution of mass of the aircraft. In models for flying on a tether, weights or the like may be appropriately positioned within the fuselage to appropriately position the center of gravity as desired. In the preferred embodiment, the center of gravity is approximately at or slightly aft of the trailing edge of the wing. Thus, by positioning the horizontal stabilizer toward the rear of the aircraft, the moment arm of the fuselage between the center of gravity and the horizontal stabilizer permits the use of relatively low collective lift on the horizontal stabilizer and therefore the horizontal stabilizer can be of scale dimensions substantially corresponding to the horizontal stabilizer in conventional aircraft.

Where the aircraft is to be flown in a tethered arrangement, the tether line is attached at the forward end of the fuselage. Obviously, whether the aircraft is powered, towed or tethered, forward thrust is determined by relative wind. When the aircraft is flown in a tethered arrangement, the length of the tether line, the angle of the tether line and the weight of the tether line will all affect performance characteristics of the craft under certain conditions. However, for relatively small lightweight craft used as kites, extremely lightweight line such as ten pound test or the like is suitable. Thus when the line is relatively short, the aircraft is sufficiently near the operator that the operator can directly exercise some control over angle of attack. However, as the length of the line increases, relative thrust is provided by playing out or reeling in the tether line and by natural changes in relative wind. Thus the thrust line is determined by the azimuthal angle between the point of attachment of the tow or tether line and the zero angle of attack center line of the craft. By varying this angle, the response of the craft to changes in relative wind will vary as desired. It should be noted that with a substantial length of tether line between the fixed remote end (operator) and the aircraft, the tether line will assume a substantially fixed angle with respect to the thrust line and the aircraft may thus be flown to a point almost directly overhead of the remote end (either fixed or controlled by an operator).

It will be noted that as the aircraft attitude changes from climb to level flight, the centers of lift of the wing and the horizontal stabilizer both move aft. Since the center of gravity is fixed, the center of gravity thus moves forward with respect to the center of lift. Furthermore, as the angle of attack is reduced, lift is reduced but high drag conditions are maintained. Thus as the aircraft approaches level flight, the high drag component prevents the aircraft from increasing its forward velocity. Instead, the lifting components of the wing and horizontal stabilizer counterbalanced about the center of gravity tend to force the craft into stabilized level flight. The high induced drag of the airfoils also induces lateral stability. Therefore, the craft automatically becomes stabilized in level flight. Furthermore, if the craft is forced into a nose-down attitude (as might occur by attempting to overfly the remote end of the tether line), the horizontal stabilizer is forced into a negative lift condition and, since the center of gravity is aft of the wings, the tail immediately drops so that the craft resumes level flight conditions. By automatically dumping lift from the horizontal stabilizer, the craft is prevented from diving and overflying the tether point. Furthermore, since the lift component of the horizontal stabilizer approaches zero (or merely balances the rearwardly displaced center of gravity), the aircraft resists entering a dive attitude. Instead, the aircraft maintains level flight with a slight tendency to climb. If excess thrust is provided (as by a gust of increased relative wind) little or no attitude change will result. If relative wind is decreased, however, the rearwardly displaced center of gravity causes the craft to settle tail first, thus increasing angle of attack. Thus attitude of the aircraft can be controlled by controlling relative wind. This may be accomplished, for example, by varying the length of the tether line. Accordingly, the aircraft may be caused to climb, cruise and even make stall landings by appropriately controlling the single tether line.

It will be observed that the aircraft configuration described hereinabove is uniquely suitable for use in tethered arrangements since the relative lifting airfoil configurations can be fixed and the aircraft remain extremely stable in low relative wind. In the configurations discussed, a tethered craft can be flown and maneuvered in relative wind as low as three to eight knots. However, since the only flight dynamics penalty for the fixed configuration is high induced drag at level flight, the craft can also be towed for use as a target or the like. The aircraft may also even be flown in powered configurations for low speed drones, if desired, for target practice or for low speed stable observation or photographic missions.

Figure 4:
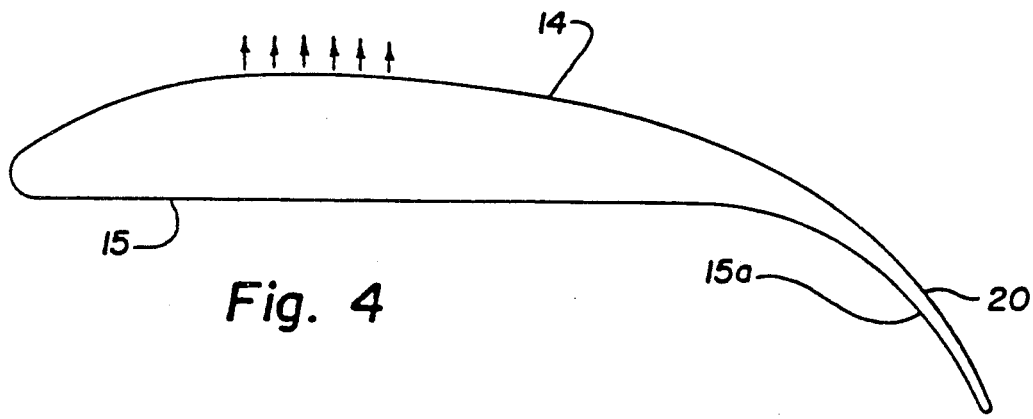
FIG. 4 is a sectional view of another alternative embodiment of the modified airfoil of the invention.
Figure 5:
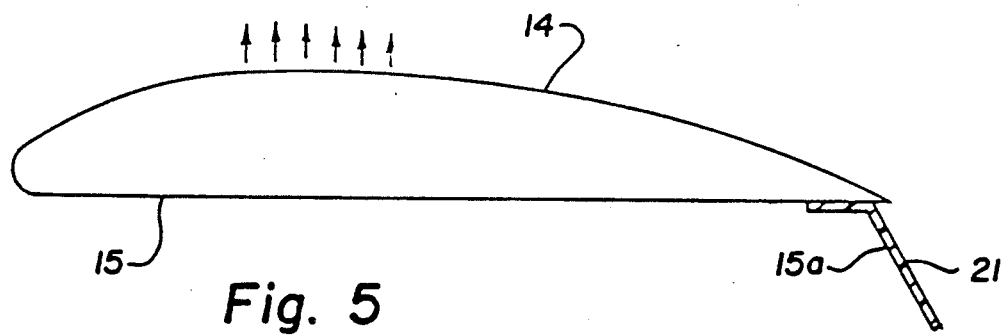
FIG. 5 is a sectional view of yet another alternative embodiment of the modified airfoil of the invention.

It is essential that the airfoil of the invention provide at least two distinct lift components, one of which moves fore to aft with changes in angle of attack while the other remains relatively fixed (fore to aft with changes in angle of attack) and must produce a relatively high induced drag. Within these limitations, however, the airfoil may take various forms. For example, FIG. 4 illustrates a more conventional appearing airfoil with a convexly curved upper surface 14 and a relatively flat lower surface 15 joined to form a leading edge. However, at the trailing edge both the upper and lower surfaces deviate sharply downwardly depending trailing edge 20. Downwardly depending trailing edge 20 functions in much the same manner as described hereinabove since the airfoil still includes the same sharply downwardly diverging section 15a on the lower surface which produces the second distinct component of lift. However, the curved upper surface of section 20 will produce less induced drag under most conditions.

Where it is particularly desired to produce an aircraft in accordance with the invention but which visually appears to employ a conventional airfoil, the trailing edge portion of the airfoil may be made substantially transparent by using clear plastic material or the like. This may be accomplished by forming any of the modified airfoils discussed herein using clear materials and painting or otherwise coloring only that portion of the airfoil which provides conventional shape. Alternatively, a conventional airfoil may be used if modified as shown in FIG. 5. In this embodiment a substantially L-shaped (in cross-section) and inverted member of substantially transparent material is attached to either the upper or lower surface at or near the trailing edge of the airfoil to form a sharply downwardly depending flange 21. The flange member 21 thus positioned provides both the required substantially fixed (fore to aft) component of lift as well as high induced drag. However, since it is substantially transparent it is virtually invisible to the naked eye at a distance from the aircraft. Thus an aircraft employing this embodiment will, when viewed from a distance, appear to employ only conventional airfoils.

In view of the foregoing, various applications of the principles of the invention will readily be apparent to those skilled in the art. It will be understood, therefore, that although the invention has been described with particular reference to specific embodiments thereof, the forms of the invention shown and described in detail are to be taken as preferred embodiments thereof. Various changes and modifications may be resorted to without departing from the spirit and scope of the invention as defined by the appended claims.

What is claimed:

1. An aircraft including a fuselage, wings and a horizontal stabilizer longitudinally displaced from the wings, said wings and horizontal stabilizer each consisting of an airfoil having a leading edge and a trailing edge and which defines a chord extending along a straight line connecting the leading edge of said airfoil to the nearest point on the trailing edge thereof, wherein:
   (a) said wings define an airfoil with an upper surface and a generally concave lower surface adjacent the trailing edge of said airfoil, the generally concave shape of said lower surface adjacent the trailing edge formed by a curved surface which, at least at one horizontal position, deviates downwardly at a greater angle than said upper surface at the corresponding horizontal position and which deviates downwardly with increasing distance from the leading edge so that the trailing edge of said airfoil is defined by a relatively broad flat surface lying in a plane substantially normal to said chord;
   (b) said horizontal stabilizer defines an airfoil with an upper surface and a generally concave lower surface adjacent the trailing edge of said airfoil, the generally concave shape of said lower surface adjacent the trailing edge formed by a curved surface which, at least at one horizontal position, deviates downwardly at a greater angle than said upper surface at the corresponding horizontal position and which deviates downwardly with increasing distance from the leading edge so that the trailing edge of said airfoil is defined by a relatively broad flat surface lying in a plane substantially normal to said chord; and
   (c) the center of gravity of said aircraft is located between the mean center of lift of said wings and the mean center of lift of said horizontal stabilizer.

2. An aircraft as defined in claim 1 wherein the airfoil of said wings is defined in cross-section by a convexly curved upper surface and a lower surface extending rearwardly from the leading edge of said wing substantially parallel with the chord of said wing for a major portion thereof and then deviating concavely to define a downwardly diverging section which deviates downwardly at a greater angle than the corresponding upper surface deviates downwardly.

3. An aircraft as defined in claim 2 wherein said downwardly diverging section is defined by a curved line of varying radius.

4. An aircraft as defined in claim 1 wherein the airfoil of said wings is defined in cross-section by an upper surface extending substantially parallel with the chord of said wing and a lower surface extending rearwardly from the leading edge of said wing substantially parallel with the chord of said wing for a major portion thereof and then deviating concavely away from the chord of the wing to define a generally thickened cross-sectional portion adjacent the trailing edge of said wing.

5. An aircraft as defined in claim 1 wherein the airfoil of said horizontal stabilizer is defined in cross-section by a convexly curved upper surface and a lower surface extending rearwardly from the leading edge of said horizontal stabilizer substantially parallel with the chord of said horizontal stabilizer for a major portion thereof and then deviating concavely to define a downwardly diverging section which deviates downwardly at a greater angle than the corresponding upper surface deviates downwardly.

6. An aircraft as defined in claim 5 wherein said downwardly diverging section is defined by a curved line of increasing radius.

7. An aircraft as defined in claim 1 wherein the airfoil of said horizontal stabilizer is defined in cross-section by an upper surface extending substantially parallel with the chord of said horizontal stabilizer and a lower surface extending rearwardly from the leading edge of said horizontal stabilizer substantially parallel with the chord of said horizontal stabilizer for a major portion thereof and then deviating concavely to define a generally thickened cross-sectional portion adjacent the trailing edge of said horizontal stabilizer.

8. An aircraft including a fuselage, wings and a horizontal stabilizer longitudinally displaced from the wings, said wings and horizontal stabilizer each consisting of an airfoil having a leading edge and a trailing edge and which defines a chord extending along a straight line connecting the leading edge of said airfoil to the nearest point on the trailing edge thereof, wherein:
   (a) said wings define an airfoil with an upper surface and a generally concave lower surface adjacent the trailing edge of said airfoil, the generally concave shape of said lower surface adjacent the trailing edge formed by at least two interconnected substantially flat surfaces which, at least at one horizontal position, form a concave surface which deviates downwardly at a greater angle than said upper surface at the corresponding horizontal position and which deviates downwardly with increasing distance from the leading edge so that the trailing edge of said airfoil is defined by a relatively broad flat surface lying in a plane substantially normal to said chord;

(b) said horizontal stabilizer defines an airfoil with an upper surface and a generally concave lower surface adjacent the trailing edge of said airfoil, the generally concave shape of said lower surface adjacent the trailing edge formed by at least two interconnected substantially flat surfaces which, at least at one horizontal position, form a concave surface which deviates downwardly at a greater angle than said upper surface at the corresponding horizontal position and which deviates downwardly with increasing distance from the leading edge so that the trailing edge of said airfoil is defined by a relatively broad flat surface lying in a plane substantially normal to said chord; and (c) the center of gravity of said aircraft is located between the mean center of lift of said wings and the mean center of lift of said horizontal stabilizer.

9. An aircraft as defined in claim 8 wherein the airfoil of said wings is defined in cross-section by a convexly curved upper surface and a lower surface extending rearwardly from the leading edge of said wing substantially parallel with the chord of said wing for a major portion thereof and then deviating concavely to define a downwardly diverging section which deviates at a greater angle than the corresponding upper surface.

10. An aircraft as defined in claim 9 wherein said downwardly diverging is defined by a substantially straight line.

11. An aircraft as defined in claim 8 wherein the airfoil of said wings is defined in cross-section by an upper surface extending substantially parallel with the chord of said wing and a lower surface extending rearwardly from the leading edge of said wing substantially parallel with the chord of said wing for a major portion thereof and then deviating downwardly to define a generally thickened cross-sectional portion adjacent the trailing edge of said wing.

12. An aircraft as defined in claim 8 wherein the airfoil of said horizontal stabilizer is defined in cross-section by a convexly curved upper surface and a lower surface extending rearwardly from the leading edge of said horizontal stabilizer substantially parallel with the chord of said horizontal stabilizer for a major portion thereof and then deviating downwardly to define a downwardly diverging section which deviates downwardly at a greater angle than the corresponding upper surface.

13. An aircraft as defined in claim 12 wherein said downwardly diverging section is defined by a substantially straight line.

14. An aircraft as defined in claim 8 wherein the airfoil of said horizontal stabilizer is defined in cross-section by an upper surface extending substantially parallel with the chord of said horizontal stabilizer and a lower surface extending rearwardly from the leading edge of said horizontal stabilizer substantially parallel with said chord for a major portion thereof and then deviating concavely to define a generally thickened cross-sectional portion adjacent the trailing edge of said horizontal stabilizer.

15. An aircraft including a fuselage, wings and a horizontal stabilizer longitudinally displaced rearwardly from the wings, said wings and horizontal stabilizer each consisting of an airfoil defining a chord, wherein:

(a) said wings and said horizontal stabilizer each define an airfoil with an upper surface and a generally concave lower surface adjacent the trailing edge of said airfoil, the generally concave shape of said lower surface adjacent the trailing edge formed by a curved surface which, at least at one horizontal position, deviates downwardly at a greater angle than said upper surface at the corresponding horizontal position and which deviates downwardly with increasing distance from the leading edge so that said upper surface cooperates with said lower surface to provide a first distinct component of lift which moves aft with decreasing angle of attack and a second distinct component of lift which does not move substantially fore and aft with changes in angle of attack; and (b) the center of gravity of said aircraft is located between the mean center of lift of said wings and the mean center of lift of said horizontal stabilizer.

16. An aircraft as defined in claim 15 wherein the portion of said lower surface which deviates downwardly near the trailing edge to provide said second distinct center of lift is a sharply downwardly depending extension of the trailing edge of said airfoil.

17. An aircraft as defined in claim 15 wherein the portion of said lower surface which deviates downwardly near the trailing edge to provide said second distinct center of lift is defined by a sharply downwardly depending flange member forming the trailing edge of said airfoil.

18. An aircraft as defined in claim 17 wherein said sharply downwardly depending flange member is substantially transparent.

19. An aircraft including a fuselage, wings and a horizontal stabilizer longitudinally displaced rearwardly from the wings, said wings and horizontal stabilizer each consisting of an airfoil defining a chord, wherein:

(a) said wings and said horizontal stabilizer each define an airfoil with an upper surface and a generally concave lower surface adjacent the trailing edge of said airfoil, the generally concave shape of said lower surface adjacent the trailing edge formed by air least two interconnected substantially flat surfaces which, at least at one horizontal position, form a concave surface which deviates downwardly at a greater angle than said upper surface at the corresponding horizontal position and which deviates downwardly with increasing distance from the leading edge so that said upper surface cooperates with said lower surface to provide a first distinct component of lift which moves aft with decreasing angle of attack and a second distinct component of lift which does not move substantially fore and aft with changes in angle of attack; and (b) the center of gravity of said aircraft is located between the mean center of lift of said wings and the mean center of lift of said horizontal stabilizer.

20. An aircraft as defined in claim 19 wherein the portion of said lower surface which deviates downwardly near the trailing edge to provide said second distinct center of lift is a sharply downwardly depending extension of the trailing edge of said airfoil.

21. An aircraft as defined in claim 19 wherein the portion of said lower surface which deviates downwardly from the chord of said airfoil near the trailing edge to provide said second distinct center of lift is a sharply downwardly depending flange member secured to said airfoil near the trailing edge of said airfoil.

22. An aircraft as defined in claim 21 wherein said sharply downwardly depending flange member is substantially transparent.

23. An aircraft including a fuselage, wings and a horizontal stabilizer longitudinally displaced from said wings, each of said wings and said horizontal stabilizer defining an airfoil having a leading edge, a trailing edge, a chord extending directly along a straight line from the leading edge to the nearest point on the trailing edge, an upper surface and a lower surface to provide lift as said airfoil passes through relative wind, wherein:
   (a) said wings define an airfoil with an upper surface and a generally concave lower surface adjacent the trailing edge of said airfoil, the generally concave curvature of said lower surface adjacent the trailing edge being substantially greater than the curvature of the corresponding portion of said upper surface and deviating downwardly with increasing distance from the leading edge so that the trailing edge of said airfoil is defined by a relatively broad flat surface lying in a plane substantially normal to said chord;
   (b) said horizontal stabilizer defines an airfoil with an upper surface and a generally concave lower surface adjacent edge of said airfoil, the generally concave curvature of said lower surface adjacent the trailing edge being substantially greater than the curvature of the corresponding portion of said upper surface and deviating downwardly with increasing distance from the leading edge so that the trailing edge of said airfoil is defined by a relatively broad flat surface lying in a plane substantially normal to said chord; and
   (c) the center of gravity of said aircraft is located between the mean center of lift of said wings and the mean center of lift of said horizontal stabilizer.

24. An aircraft as defined in claim 23 wherein the airfoil of said wings is defined is cross-section by a convexly curved upper surface and a lower surface extending rearwardly from the leading edge of said wing substantially parallel with the chord of said wing for a major portion thereof and then deviating concavely to define a downwardly diverging section which deviates downwardly at a greater angle than the corresponding upper surface.

25. An aircraft as defined in claim 24 wherein said downwardly diverging section is defined by a curved line of varying radius.

26. An aircraft as defined in claim 24 wherein said downwardly diverging section is defined by a substantially straight line.

27. An aircraft as defined in claim 23 wherein the airfoil of said wings is defined in cross-section by an upper surface extending substantially parallel with the chord of said wing and a lower surface extending rearwardly from the leading edge of said wing substantially parallel with said chord for a major portion thereof and then deviating concavely to define a generally thickened cross-sectional portion adjacent the trailing edge of said wing.

28. An aircraft as defined in claim 23 wherein the airfoil of said horizontal stabilizer is defined in cross-section by a convexly curved upper surface and a lower surface extending rearwardly from the leading edge of said horizontal stabilizer substantially parallel with the chord of said horizontal stabilizer for a major portion thereof and then deviating concavely to define a downwardly diverging section which deviates downwardly at a greater angle than the corresponding upper surface.

29. An aircraft as defined in claim 28 wherein said downwardly diverging section is defined by a curved line of increasing radius.

30. An aircraft as defined in claim 28 wherein said downwardly diverging section is defined by a substantially straight line.

31. An aircraft as defined in claim 23 wherein the airfoil of said horizontal stabilizer is defined in cross-section by an upper surface extending substantially parallel with the chord of said horizontal stabilizer and a lower surface extending rearwardly from the leading edge of said horizontal stabilizer substantially parallel with said chord for a major portion thereof and then deviating concavely to define a generally thickened cross-sectional portion adjacent the trailing edge of said horizontal stabilizer.

32. An aircraft including a fuselage, wings and a horizontal stabilizer longitudinally displaced rearwardly from said wings wherein:
   (a) said wings and said horizontal stabilizer each form an airfoil having an upper surface, a lower surface, a leading edge and a trailing edge and defining a chord extending in a straight line directly from said leading edge to said trailing edge defined in cross-section by an upper surface and a lower surface joined to form a leading edge, said lower surface extending rearwardly from said leading edge for a major portion of said airfoil and cooperating with said upper surface to provide a first distinct component of lift which moves aft with decreasing angle of attack, said lower surface deviating substantially downwardly near the trailing edge to provide a second distinct component of lift which does not move substantially fore and aft with changes in angle of attack, wherein the trailing edge of said airfoil is defined by a relatively broad flat surface lying in a plane substantially normal to the chord of said airfoil; and
   (b) the center of gravity of said aircraft is located between the mean center of lift of said wings and the mean center of lift of said horizontal stabilizer.

33. An aircraft including a fuselage, wings and a horizontal stabilizer longitudinally displaced rearwardly from said wings wherein:
   (a) said wings and said horizontal stabilizer each form an airfoil having an upper surface, a lower surface, a leading edge and a trailing edge and defining a chord extending in a straight line directly from said leading edge to said trailing edge defined in cross-section by an upper surface and a lower surface joined to form a leading edge, said lower surface extending rearwardly from said leading edge for a major portion of said airfoil and cooperating with said upper surface to provide a first distinct component of lift which moves aft with decreasing angle of attack, said lower surface deviating substantially downwardly near the trailing edge to provide a second distinct component of lift which does not move substantially fore and aft with changes in angle of attack; and
   (b) the center of gravity of said aircraft is located between the mean center of lift of said wings and the mean center of lift of said horizontal stabilizer.

34. An aircraft as defined in claim 33 wherein said lower surface deviating substantially downwardly near the trailing edge of provide a second distinct center of lift is a sharply downwardly depending extension of the trailing edge of said airfoil.

35. An aircraft as defined in claim 33 wherein said lower surface deviating substantially downwardly near the trailing edge to provide a second distinct center of lift is defined by a sharply downwardly depending flange member forming the trailing edge of said airfoil.

36. An aircraft as defined in claim 35 wherein said sharply downwardly depending flange member is substantially transparent.

* * * * *

UNITED STATES PATENT AND TRADEMARK OFFICE
CERTIFICATE OF CORRECTION

PATENT NO. : 5,076,516

DATED : December 31, 1991

INVENTOR(S) : Robert B. Wheat, et al.

It is certified that error appears in the above-identified patent and that said Letters Patent is hereby corrected as shown below:

Column 9, line 30, after "deviates" insert ---downwardly---
Column 9, line 33, after "diverging" insert ---section---
Column 11, line 13, after "surface" insert ---formed---
Column 11, line 28, after "adjacent" insert ---the trailing---

Signed and Sealed this

Thirteenth Day of April, 1993

Attest:

STEPHEN G. KUNIN

Attesting Officer     Acting Commissioner of Patents and Trademarks